(12) United States Patent
Sato (10) Patent No.: US 8,060,912 B2
(45) Date of Patent: Nov. 15, 2011

(54) CONTENT REPRODUCTION DEVICE AND CONTROL METHOD THEREOF

(75) Inventor: Koji Sato, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 939 days.

(21) Appl. No.: 11/387,835

(22) Filed: Mar. 24, 2006

(65) Prior Publication Data

US 2007/0250888 A1    Oct. 25, 2007

(30) Foreign Application Priority Data

Mar. 22, 2006  (JP) ................ 2006-079785

(51) Int. Cl.
    *H04N 7/173*   (2006.01)
(52) U.S. Cl. ........... 725/134; 725/34; 725/32; 725/131; 725/105; 725/139; 725/135
(58) Field of Classification Search .......... 725/134, 725/34, 32, 131, 105, 139, 135
    See application file for complete search history.

(56) References Cited

U.S. PATENT DOCUMENTS

| | | | |
|---|---|---|---|
| 6,698,020 B1* | 2/2004 | Zigmond et al. ........ | 725/34 |
| 2002/0087401 A1* | 7/2002 | Leapman et al. ........ | 705/14 |
| 2002/0178447 A1* | 11/2002 | Plotnick et al. ........ | 725/36 |
| 2003/0145331 A1* | 7/2003 | Escobar et al. ........ | 725/110 |
| 2004/0148555 A1* | 7/2004 | Blackburn et al. ........ | 714/747 |
| 2004/0158858 A1* | 8/2004 | Paxton et al. ........ | 725/42 |
| 2004/0268387 A1* | 12/2004 | Wendling ........ | 725/35 |
| 2006/0085816 A1* | 4/2006 | Funk et al. ........ | 725/34 |
| 2007/0219859 A1* | 9/2007 | Huntington ........ | 705/14 |

FOREIGN PATENT DOCUMENTS

| | | |
|---|---|---|
| JP | 08-115361 A | 5/1996 |
| JP | 2000-115166 A | 4/2000 |
| JP | 2001-136453 A | 5/2001 |
| JP | 2003-51797 A | 2/2003 |
| JP | 2003-067278 A | 3/2003 |
| JP | 2003-203041 A | 7/2003 |
| JP | 2004-186890 A | 7/2004 |
| JP | 2004-304835 A | 10/2004 |

* cited by examiner

*Primary Examiner* — Benny Tieu
*Assistant Examiner* — Paul F Payer
(74) *Attorney, Agent, or Firm* — Birch, Stewart, Kolasch & Birch, LLP (57) ABSTRACT

A mobile phone, which is capable of reproducing a broadcast program supplied through a broadcast wave and stored programs stored in a program data storage, is provided with (i) a program ID extraction section that obtains a broadcast program ID for identifying a supplied broadcast program and a stored program ID for identifying a stored program, and (ii) a program reproduction control section that selects, as a reproduced program, at least one of a broadcast program and stored programs. On this account, a suitable program is selected and reproduced even if a broadcast program is broadcasted in a one-to-many manner. As a result, a suitable reproduced program is selected at suitable timing, in accordance with a supplied broadcast program and stored programs, and hence diversified needs of the users are satisfied.

14 Claims, 4 Drawing Sheets

| C1 ↓ | C2 ↓ | C3 ↓ | C4 ↓ |
|---|---|---|---|
| program ID | receiving date | address to be referred to | number of reproductions |
| 100000121117866 | 2005/7/21 20:20 | 0x0A··· | 3 |
| 100000121117868 | 2005/7/22 20:00 | 0x01··· | 1 |
| ⋮ | ⋮ | ⋮ | ⋮ |

FIG. 4

| | CO1 | CO2 | CO3 | CO4 | CO5 | CO6 | CO7 | CO8 |
|---|---|---|---|---|---|---|---|---|
| templates | | rules | broadcast program IDs | stored program IDs | reproduction conditions | reproduced program IDs | processes | purchase completion signal |
| TEMP1 | | RULE1 | CM1 | CM2,3,4,5 | — | CM1 | store CM1 and number of reproductions of CM1 = 1 | refer to TEMP2 |
| | | RULE2 | CM1 | CM1,2,3,4,5 | number of reproductions of CM1 < 3 | CM1 | add 1 to the number of reproductions of CM1 | |
| | | RULE3 | CM1 | CM1,2,3,4,5 | number of reproductions of CM1 = 3 | CM2 | number of reproductions of CM2 = 1 | refer to TEMP3 |
| | | RULE4 | CM1 | CM1,2,3,4,5 | number of reproductions of CM1 = 3 and number of reproductions of CM2 < 3 | CM2 | add 1 to the number of reproductions of CM2 | |
| | | RULE5 | CM1 | CM1,2,3,4,5 | number of reproductions of CM1 = 3 and number of reproductions of CM2 = 3 | CM5 | delete CM1,CM2,CM3,CM4, and CM5 | |
| TEMP2 | | RULE1 | CM1 | CM1,2,3,4,5 | number of reproductions of CM3 < 3 | CM3 | add 1 to the number of reproductions of CM3 | refer to TEMP3 |
| | | RULE2 | CM1 | CM1,2,3,4,5 | number of reproductions of CM3 = 3 | CM5 | delete CM1,CM2,CM3,CM4, and CM5 | — |
| TEMP3 | | RULE1 | CM1 | CM1,2,3,4,5 | — | CM4 | delete CM1,CM2,CM3,CM4, and CM5 | — |
| | | RULE2 | CMX different from any one of CM1, CM2, CM3, CM4, and CM5 | CM1,2,3,4,5 | CM6-CM12 | CM4+CMX | store CMX, number of reproductions of CMX = 1, and add 1 to the number of reproductions of CM4 | — |

FIG. 5

CONTENT REPRODUCTION DEVICE AND CONTROL METHOD THEREOF

This Nonprovisional application claims priority under 35 U.S.C. §119(a) on Patent Application No. 79785/2006 filed in Japan on Mar. 22, 2006, the entire contents of which are hereby incorporated by reference.

BACKGROUND OF THE INVENTION

1. Field of the Invention

The present invention relates to a content reproduction device and a control method of the content reproduction device, for achieving a bidirectional content delivery service with the cooperation of broadcasting and communications.

2. Description of the Related Art

In tandem with the advancement of network technologies, the number of terminals connected to the Internet has dramatically increased, and new services based on the cooperation of conventional broadcasting services and network-based communications services have emerged. Broadcasting services are advantageous in that, through one-to-many broadcasting, a plurality of users can simultaneously enjoy a service.

As it has become possible to add, to such broadcasting services, network-based services, bidirectional services with the cooperation of broadcasting and communications are considered to become popular in near future.

More specifically, For example, under a bidirectional service with the cooperation of broadcasting and communications, contents are broadcasted on broadcast waves and received by receiving terminals (content reproduction devices) of many users. Those content reproduction devices receiving the contents can respond to the contents via a communications service. For example, access to a related information service is carried out via a network, based on information of an access target (e.g. server), which information is included in the delivered contents.

In the bidirectional services, service providers who provide contents are required to satisfy users' diversified needs and to provide fine-tuned services.

To achieve these requirements, for example, Japanese Laid-Open Patent Application No. 8-115361 (published on May 7, 1996) discloses a technique in which, user-specific information is extracted based on a user identifier for specifying the user, and a user-specific service is added to common service information (for example, user-specific contents suitable for each user are delivered).

According to the technique above, however, it is not possible to provide fine-tuned services corresponding to diversified needs of the users, if the technique is adopted to push-model services such as one-to-many broadcasting of contents.

In addition to the above, the most suitable content to be reproduced by a content reproduction device of the aforesaid patent document changes in line with use conditions (e.g. which content is supplied (reproduced)). The technique of the patent document above cannot take into consideration this change.

In other words, to provide fine-tuned services corresponding to diversified needs of the users, each content reproduction device is required to make a change to a delivered content in line with the use conditions, and reproduce the most appropriate content at a suitable timing.

SUMMARY OF THE INVENTION

The objective of the present invention is to provide, for a bidirectional content broadcasting system with the cooperation of broadcasting and communications, in which a content is broadcasted in a one-to-many manner, a content reproduction device and a control method of the content reproduction device, which can satisfy diversified needs of the users by presenting the most suitable content to the user at a suitable timing.

To achieve this objective, the content reproduction device of the present invention, which is capable of reproducing (i) a broadcast content supplied through a broadcast wave and (ii) a stored content stored in a content storage, includes: a broadcast content identification information obtaining section (program ID extraction section 22) for obtaining broadcast content identification information used for identifying a supplied broadcast content; a stored content identification information obtaining section (program ID extraction section 22) for obtaining stored content identification information used for identifying the stored content; and a reproduction control section (program reproduction control section 23) that selects, as at least one reproduced content, at least one of the broadcast content and the stored content, based on a combination of the obtained broadcast content identification information and the obtained stored content identification information.

Also, to achieve the objective above, the method of controlling a content reproduction device of the present invention, the content reproduction device being capable of reproducing (a) a broadcast content supplied through a broadcast wave and (b) a stored content stored in a content storage, includes the steps of: (i) obtaining broadcast content identification information used for identifying a supplied broadcast content; (ii) obtaining stored content identification information used for identifying the stored content, and (iii) based on a combination of the obtained broadcast content identification information and the obtained stored content identification information, selecting, as at least one reproduced content, at least one of the broadcast content and the stored content.

According to the arrangement above, receiving a broadcast content, the broadcast content identification information obtaining section obtains broadcast content identification information used for identifying the supplied broadcast content, while the stored content identification information obtaining section obtains stored content identification information used for identifying a stored content. Based on a combination of these sets of identification information, the reproduction control section selects, as at least one reproduced content, at least one of the broadcast content and the stored content.

In this manner, in response to the supply of a broadcast content, a reproduced content is selected in accordance with a combination of the supplied broadcast content and a stored content. It is therefore possible to select the most suitable content at the time, based on (i) which broadcast content is supplied and (ii) which content has been stored.

The content reproduction device serially receives broadcast contents, and the supplied broadcast contents are, as stored contents, stored in the content reproduction device. Therefore, even if a content that the user wishes to view (or a content that the user is encouraged to view) persistently changes, the most suitable content to be reproduced at a suitable timing can be selected by taking account of which contents have been stored (supplied).

As a result, even if a broadcast content is broadcasted in a one-to-many manner, the most suitable content is presented to the user at a suitable timing, and hence diversified needs of the users are satisfied.

Additional objects, features, and strengths of the present invention will be made clear by the description below. Further, the advantages of the present invention will be evident from the following explanation in reference to the drawings.

DETAILED DESCRIPTION OF THE INVENTION

The following will describe an embodiment of the present invention in reference to FIGS. 1-5.

The present embodiment describes an example where a content reproduction device of the present invention is adopted to a TV mobile phone (hereinafter, mobile phone) that can receive TV broadcasting and reproduce TV programs.

In the figures mentioned below, same members have same numbers, and those having identical names have identical functions. Therefore, once a member is described in detail, the description thereof is not repeated.

(Outline of Broadcasting Service Providing System)

Figure 2:
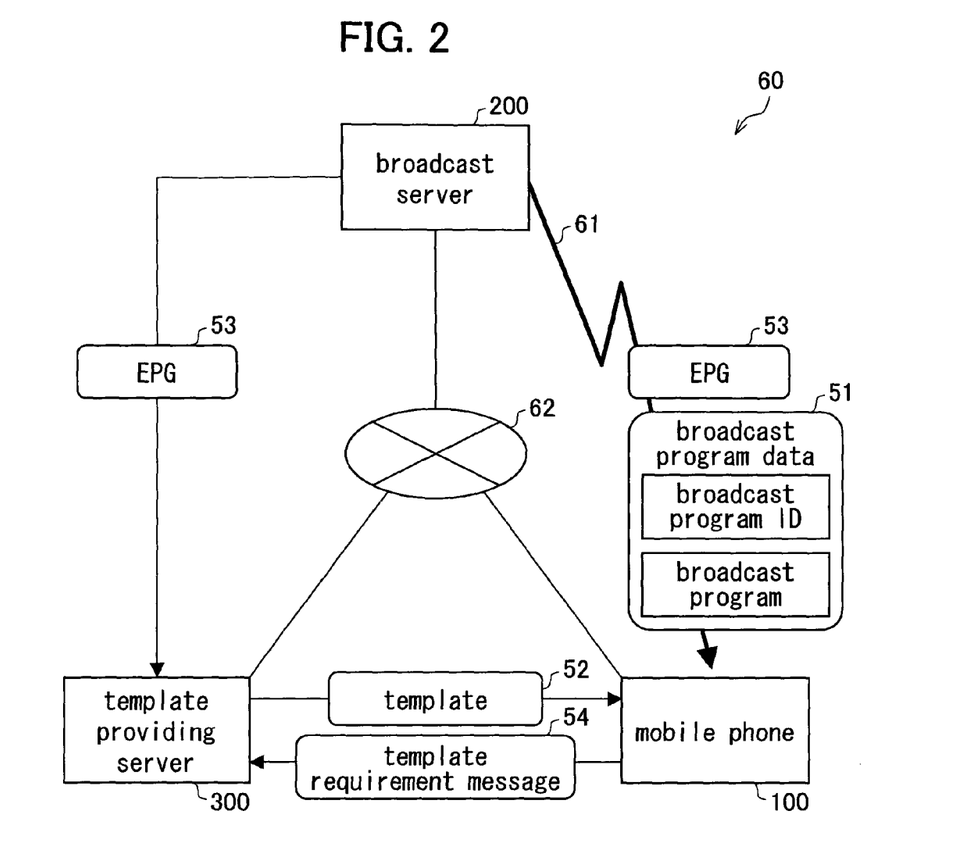
FIG. 2 outlines a broadcasting service providing system of the present invention.

FIG. 2 outlines a broadcasting service providing system 60 of the present invention.

As shown in the figure, the broadcasting service providing system 60 includes a plurality of devices capable of communicating with one another via the Internet 62. More specifically, the broadcasting service providing system 60 includes: a mobile phone 100 that receives and reproduces broadcast programs; a broadcast server 200 supplying broadcast programs; and a template providing server 300 that provides a template 52 including information with regard to the control of program reproduction in the mobile phone 100.

The broadcast server 200 provides broadcast programs to the mobile phone 100, by means of a broadcast wave 61. More specifically, the broadcast server 200 generates and broadcasts broadcast program data 51 including (i) a broadcast program to be reproduced by the mobile phone 100 and (ii) meta-information (e.g. a broadcast program ID for identifying the program) in regard of the program. By the way, in addition to the broadcast program data 51, an EPG (Electronic Program Guide) 53 providing information of broadcast programs may be supplied to the mobile phone 100 by means of the broadcast wave 61.

The template providing server 300 provides a template to the mobile phone 100. A template is information for controlling program reproduction on the mobile phone 100. Because a template 52 is provided in the mobile phone 100, the user of the mobile phone 100 can enjoy services. In the present embodiment, the content of a service is equal to the supply of the template. Using the template, the mobile phone 100 can reproduce another program related to the broadcast program. Said another program is a special content which is only reproducible on the mobile phone 100 having the aforesaid template. The template providing server 300 obtains in advance a permit from the broadcast server 200 that provides broadcast programs, and generates a template 52 in regard of a broadcast program to be broadcasted by the broadcast server 200. The template providing server 300 supplies the generated template 52 to the mobile phone 100.

Also, the template providing server 300 provides, via the Internet 62, a program related to the broadcast server 200 to the mobile phone 100.

The mobile phone 100 receives broadcast program data 51 from the broadcast server 200, so as to reproduce a broadcast program included in the data 51. In the present embodiment, the mobile phone 100 stores, in a storage (included in, for example, the mobile phone 100), a received broadcast program (broadcast content). Hereinafter, broadcast programs stored in the storage will be referred to as stored programs (stored contents).

The mobile phone 100 receives a template 52 from the template providing server 300, via the interne 62. In line with the received template 52, the mobile phone 100 reproduces a broadcast program and/or a stored program. Hereinafter, a program reproduced by the mobile phone 100 is termed a reproduced program (reproduced content). The template 52 may be supplied to the mobile phone 100 from the template providing server 300 at a predetermined timing. Alternatively, the following arrangement may be adopted: the mobile phone 100 sends, via the Internet 62, a template requirement message 54 to the template providing server 300, so as to obtain the template from the template providing server 300 in response to the message 54.

The mobile phone 100 may conduct a predetermined process in regard of a reproduced program. A concrete example of the predetermined process is as follows: in a case where a reproduced program is a TV shopping program, address information (e.g. URL (Uniform Resource Locator)) of a selling agency, which is shown in the program, is identified, and a product is purchased by accessing the server of the selling agency.

In the present embodiment, a mobile phone 100 that receives and reproduces broadcast programs is taken as an example of the content reproduction device of the present invention. Not limited to this example, the content reproduction device of the present invention may be any types of an information processing device that (i) includes a communication device by which communications with external devices are conducted via a network and (ii) can receive and reproduce broadcast programs supplied from the broadcast server 200. Examples of the content reproduction device include a TV receiver, personal computer, and PDA (Personal Digital Assistant).

The present embodiment assumes that broadcast programs broadcasted by the broadcast server 200 are video data, but broadcast programs are not limited to this type. Supplied from the broadcast server 200 may be any types of data, e.g. video data, image data, audio data, and text data.

In the broadcasting service providing system 60, a part of information supplied from the broadcast server 200 may be scrambled. A mobile phone 100 using scrambled information supplied from the broadcast server 200 requires key information. For example, confidential information is encrypted by public key encryption. A requirement of key information, which is supplied from the mobile phone 100 of each user to the broadcast server 200, has an electronic signature, in order to prevent alteration and prove the adequacy of a requester.

(Mobile Phone)

(1) Outline

Figure 1:
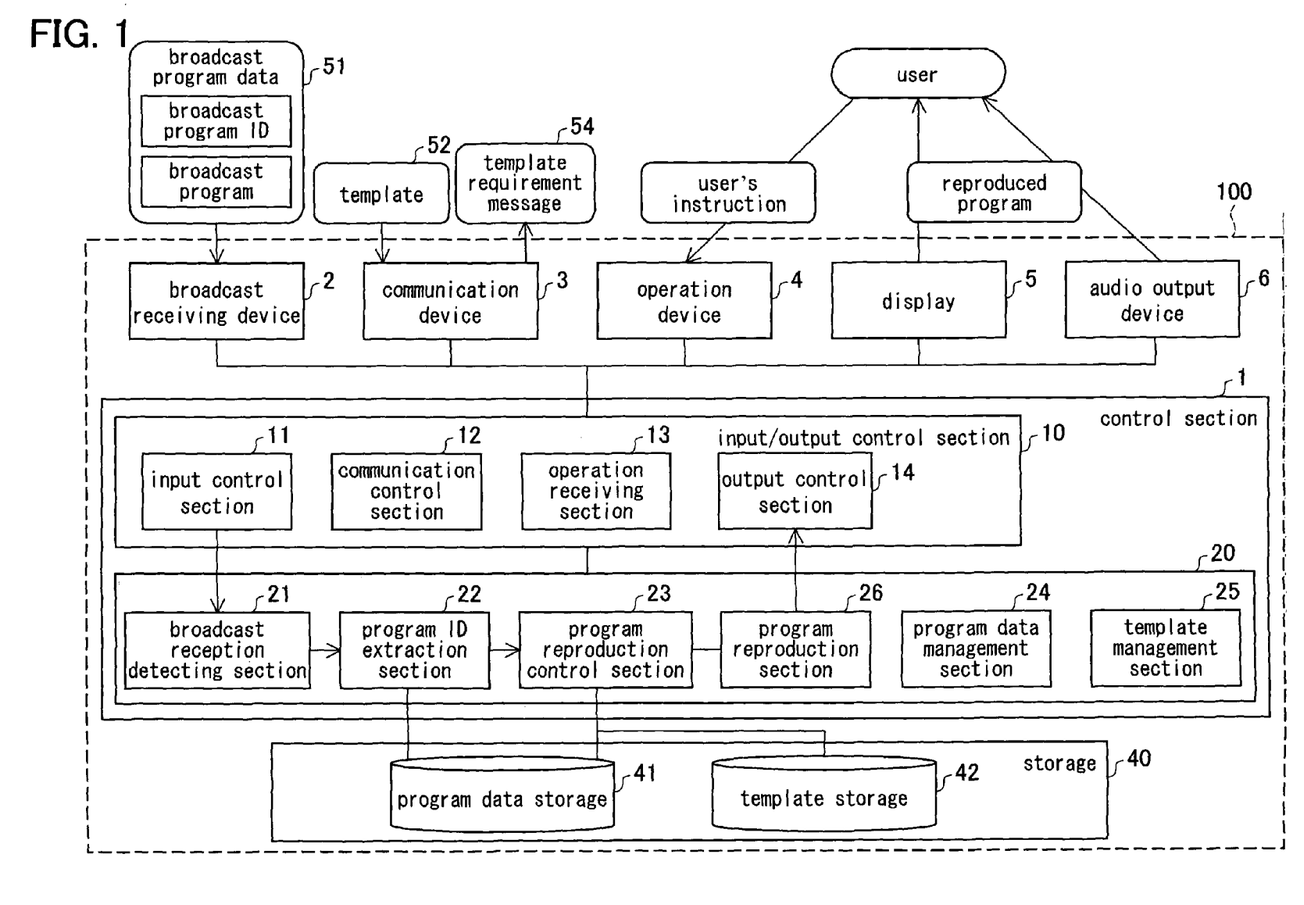
FIG. 1 is a block diagram showing a mobile phone of an embodiment of the present invention.

FIG. 1 is a block diagram illustrating the mobile phone 100 of the present embodiment. As shown in the figure, the mobile phone (content reproduction device) 100 includes a control section 1, broadcast receiving device 2, a communication device 3, an operation device 4, a display 5, an audio output device 6, and a storage 40.

The storage 40 stores programs executed by the control section 1 and various types of data read out when the control section 1 manages or controls the reproduction of broadcast (stored) program data and a template. Details of the control section 1 and the storage 40 will be given later.

The operation device 4 is signal input means by which the user inputs signals in order to operate the mobile phone 100. In the present embodiment, for example, the operation device 4 includes operation keys (arrow key, numeric keys, or the like) on the mobile phone 100. Instruction signals generated by the operation of keys of the operation device 4 are supplied to the control section 1.

An instruction to a reproduced program is inputted by the user using the operation device 4. An example of the instruction is to access information such as a URL shown in the reproduced program. More specifically, purchase of a product shown in the program may be instructed. Other examples of the instruction include fast-forward, rewind, or stop of a stored program.

The broadcast receiving device 2 receives, from the broadcast server 200, broadcast program data 51 on a broadcast wave. The broadcast receiving device 2 of the present embodiment includes a tuner, a demodulating section, a TS (Transport Stream) decoder, and the like. Broadcast program data 51 having been demodulated and decoded is stored in the storage 40. The stored data 51 is read out by the control section 1, at the time of reproducing the same.

The communication device 3 performs two-way communications with an external device, via a communications network such as the Internet, a mobile phone network, and LAN (Local Area Network). More specifically, the communication device 3 sends a template requirement message 54 to the template providing server 300, and receives a template 52 from the template providing server 300. The received template 52 is stored in the storage 40.

The display 5 outputs video data (moving image and still image) included in a reproduced program. The display 5 is, for example, a display such as LCD (Liquid Crystal Display). The audio output device 6 is a speaker for outputting audio data included in a reproduced program.

The control section 1 centrally controls the mobile phone 100. The control section 1 reads out various programs stored in the storage 40, so as to control the sections functioning as the content reproduction device of the present invention, and manage and control the reproduction of program data and a template. The control section 1 includes an input/output control section 10 and a program processing section 20.

The input/output control section 10 of the control section 1 controls information exchange between the devices (broadcast receiving device 2, communication device 3, operation device 4, display 5, and audio output device 6) of the mobile phone 100 and the program processing section 20 in the control section 1. The input/output control section 10 includes an input control section 11, a communication control section 12, an operation receiving section 13, and an output control section 14.

The operation receiving section 13 receives an instruction signal giving an instruction to a reproduced program, which signal is inputted by the user using the operation device 4. The operation receiving section 13 then supplies the instruction signal to the program processing section 20. The mobile phone 100 can therefore perform an instructed process in response to the operation by the user.

The input control section 11 receives broadcast program data 51 supplied to the broadcast receiving device 2, so as to store the data 51 in the storage 40.

In a case where a stored program stored in the storage 40 is reproduced by the program processing section 20, the output control section 14 supplies video data of the reproduced program to the display 5, and/or supplies audio data to the audio output device 6. As a result, the user can enjoy images displayed on the display 5 and music coming out from the audio output device 6.

The communication control section 12 controls communications between the mobile phone 100 and an external device. More specifically, the communication control section 12 controls the communication device 3 so as to send a template requirement message 54 and receive a template 52.

Now, details of the sections of the program processing section 20 and the storage 40 will be given.

(2) Details

As shown in FIG. 1, the program processing section 20 includes a broadcast reception detecting section 21, a program ID extraction section (broadcast content identification information obtaining means/stored content identification information obtaining means) 22, a program reproduction control section (reproduction control means) 23, a program data management section 24, a template management section (template obtaining means) 25, and a program reproduction section 26. The storage 40 includes: a program data storage (content storage) 41 storing supplied broadcast program data; and a template storage 42 storing an obtained template.

The broadcast reception detecting section 21 detects whether or not a broadcast program is supplied. The supply of a program is detected when the input control section 11 receives broadcast program data 51 which has been supplied to the broadcast receiving device 2.

The program ID extraction section 22 obtains a program ID used for identifying a broadcast (stored) program. Program IDs extracted by the program ID extraction section 22 are classified into two types: The first type is broadcast program IDs (broadcast content identification information) for identifying broadcast programs detected by the broadcast reception detecting section 21. The program ID extraction section 22 extracts a broadcast program ID from supplied broadcast program data 51. The second type is stored program IDs (stored content identification information) for identifying stored programs which are stored in the program data storage 41. The program ID extraction section 22 extracts, from the program data storage 41, a stored program ID which is associated with a stored content.

The program reproduction control section 23 determines which program is to be reproduced, in a case where the broadcast reception detecting section 21 detects the reception of a broadcast program. The program reproduction control section 23 selects, as one or more reproduced program, at least one of a received broadcast program and stored programs stored in the program data storage 41, in accordance with a broadcast program ID and stored program IDs which are extracted by the program ID extraction section 22. Details of how a reproduced program is selected by the program reproduction control section 23 will be given later.

The program reproduction section 26 reproduces the program selected as the reproduced program by the program reproduction control section 23, and supplies the selected program to the output control section 14.

According to the arrangement above, receiving a broadcast program, the program ID extraction section 22 extracts program IDs in order to identify the received program and stored programs in the program data storage 41. Based on the extracted program IDs, the program reproduction control section 23 selects a program to be reproduced. In this manner, a program to be reproduced is appropriately selected based on which program is being broadcasted and which programs have been stored.

Therefore, while the mobile phone 100 serially receives broadcast programs, a program suitable to be reproduced is selected at a suitable timing, even if which content is desired by the user (or which content is desirable to be viewed by the user) constantly changes. This is because which programs have been stored in the program data storage 41 is put into consideration.

As a result, even if a broadcast program is broadcasted in a one-to-many manner, each mobile phone 100 can reproduce different programs, so that diversified needs of the users are satisfied.

The program reproduction control section 23 can select a plurality of reproduced programs and determine the order of reproduction of the programs and positions of the programs on the display screen, in accordance with a combination of program IDs extracted by the program ID extraction section 22. More specifically, for example, the program reproduction section 26 may be controlled in such a manner that a received broadcast program is shown on the main screen of the display 5, while stored programs A-C are serially shown on the sub screen of the display 5.

Now, the following will describe the program data management section 24 and the program data storage 41.

Receiving broadcast program data 51 via the input control section 11, the program data management section 24 stores the broadcast program data 51 in the program data storage 41.

Figure 3:
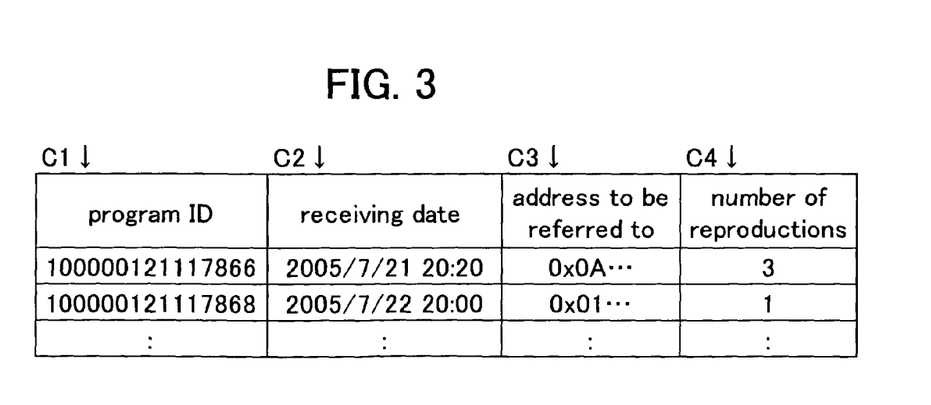
FIG. 3 shows an example of program data stored in a program data storage.

FIG. 3 shows an example of program data stored in the program data storage 41.

As shown in the figure, a program data table has 4 columns.

More specifically, the column C1 lists program IDs by which programs are uniquely identified. These program IDs are included in the broadcast program data 51. The program ID extraction section 22 refers to the column C1 to extract a stored program ID of a stored program. The column C2 shows when a set of broadcast program data 51 is supplied. The column C3 indicates areas where respective broadcast programs in the broadcast program data 51 are stored. The column C3 is referred to when the program reproduction section 26 reproduces a stored program. The column C4 shows how many times a program has been reproduced. According to the example shown in FIG. 3, the mobile phone 100 has reproduced the program with the program ID "1000001211117866" three times.

In the present embodiment, programs are identified by the program IDs. One record is provided for one program. On this account, in a case where a broadcast program A is supplied (re-broadcasted) and a stored program A having been stored in the program data storage 41 has the same program ID with the broadcast program A, new record is not added to the program data table. In this case, the receiving date and time of the stored program A are updated to the receiving date and time of the broadcast program A, and the number of reproduction is incremented by 1.

In the present embodiment, program data stored in the program data storage 41 is associated with program IDs of programs and shown in one table (hereinafter, program data table). The data structure of the program data, however, is not limited to the above. Any types of data structures can be used on condition that attributes shown in the column C1-C4 are recorded in association with each program.

The number of columns in the program data table is not necessarily four. For example, a column for storing program information (title, genre, or the like) of each program, which information is obtained from the EPG 53 (see FIG. 2), may be additionally provided.

Also, a column for storing information indicating a reproducible time (expiration date) of a stored program may be additionally provided. Referring to the column for expiration dates, the program data management section 24 can detect when an expiration date of a stored program stored in the program data storage 41 has come, so as to delete the corresponding stored program data.

To select a reproduced program, the program reproduction control section 23 may refer to the program data table shown in FIG. 3. By doing so, the program reproduction control section 23 can select a reproduced program in consideration of the number of reproductions of the stored program whose stored program ID is identical with the received broadcast program ID.

For example, assume that a broadcast program A is supplied and stored in the program data storage 41, while a stored program A having the same program ID with the broadcast program A has been stored in the program data storage 41. In this case, if the number of reproductions of the stored program A is not less than a predetermined number (e.g. 3), a stored program B which is different from neither the broadcast program A nor the stored program A may be selected as a reproduced program.

In this way, the mobile phone 100 can be controlled in such a manner that, if a program is supplied not less than a predetermined number of times, a different program is reproduced.

The program reproduction control section 23 may select a reproduced program, in accordance with a template stored in the template storage 42. As described above, a template indicates control information of a program reproduction process performed in the mobile phone 100. More specifically, in a template, rules based on which the program reproduction control section 23 selects a reproduced program are described in association with a broadcast program ID. A non-limiting example of the description format of a template is XML (Extensible Markup Language). The description format may be optionally selected on condition that the format is operable on the mobile phone 100. More preferably, the members in the broadcast service providing system 60 uniformly use one format.

The following will describe the template management section 25 that manages templates and the template storage 42 that stores templates.

Via the communication control device 12, the template management section 25 stores, in the template storage 42, a template that the communication device 3 obtains from the template providing server 300.

Figure 4:
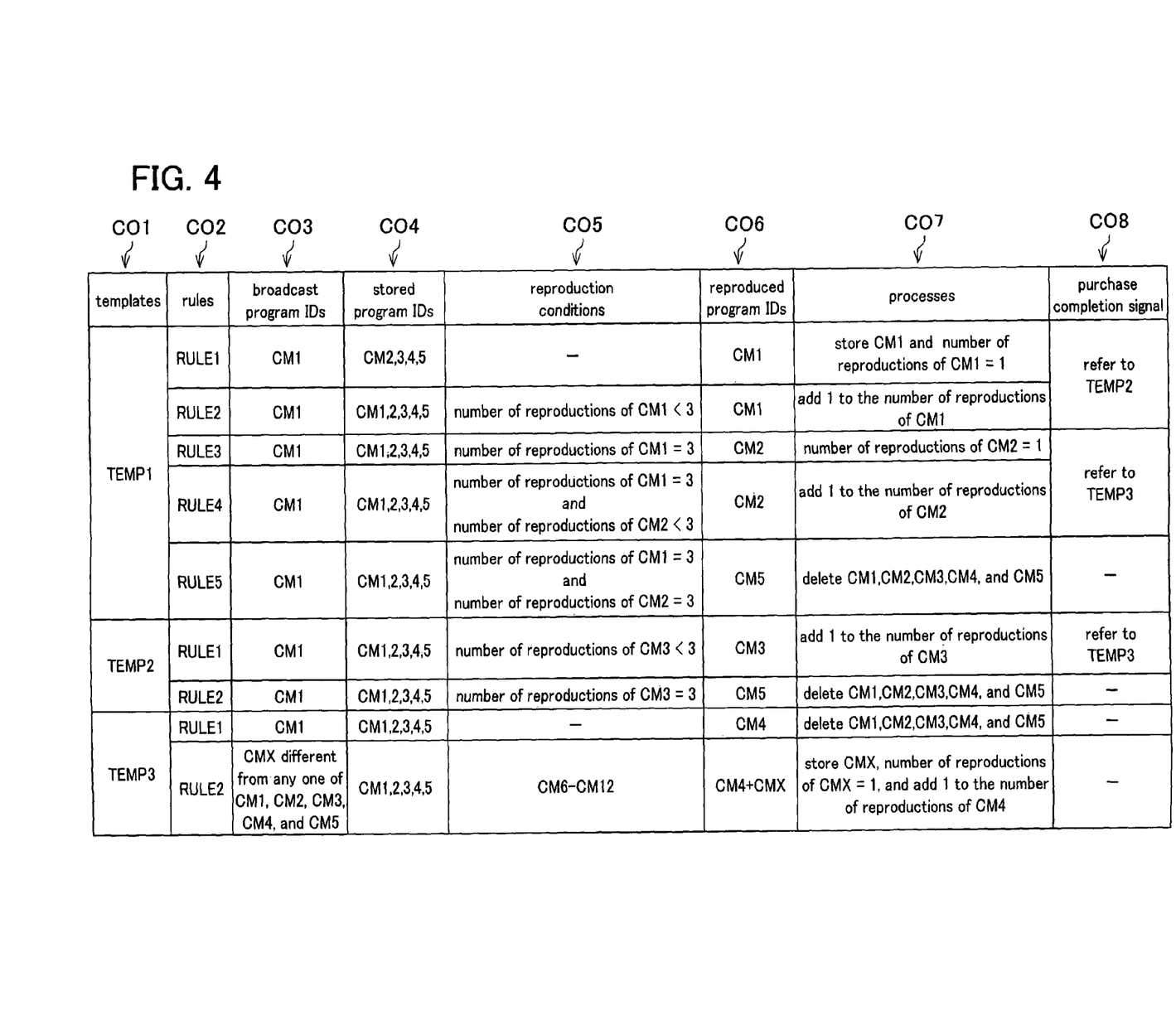
FIG. 4 shows an example of a template stored in a template storage.

FIG. 4 shows an example of a template that is stored in the template storage 42 and that the template management section 25 obtained from the template providing server 300.

One template describes rules for selecting one or more reproduced program. For example, a template 1 shown in FIG. 4 describes rules 1 to 5 (RULE 1 to RULE 5).

The reproduced program selecting rules of each template are based on combinations of broadcast program IDs and stored program IDs (In CO3 and CO4). Also, the template describes (in CO5) reproduction conditions such as the number of reproductions of a program and restriction of a reproducible program. In line with the rules based on the combinations and reproduction conditions, the program reproduction control section 23 selects a reproduced program. More specifically, CO6 describes reproduced program IDs of respective programs to be selected when the rules in CO3-CO5 are satisfied. A reproduced program is selected based on these IDs.

The program reproduction control section 23 may refer to, as timing information based on which a timing to change a template is determined, the rules based on combinations of program IDs in the CO3 and CO4 and/or reproduction conditions in the CO5. Receiving a broadcast program, the program reproduction control section 23 refers to (i) a program ID obtained by the program ID extraction section 22 and/or (ii) information stored in the program data storage 41. If the referred ID and/or information satisfy the rules and conditions indicated by in the timing information, a different template is referred to.

This allows the program reproduction control section 23 to select a reproduced program, based on different rules and conditions. As a result, the selection of a reproduced program can be changed in accordance with the change in use conditions of the mobile phone 100.

After receiving a predetermined control signal from an external device, the program reproduction control section 23 may refer to a different template.

For example, assume that a program supplied from the broadcast server 200 or the template providing server 300 is a TV shopping program that promotes the purchase of a particular product. The user of the mobile phone 100 decides to purchase the product, and in response to this, the server of a selling agency sends, to the mobile phone 100, a control signal (predetermined control signal) indicating that the purchase has completed. The supply of the special control signal from the server is unnecessary if, as a control signal, an instruction to display a completion message or the like is detected.

CO8 in FIG. 4 describes to which template the target of reference is changed, when the purchase completion signal is supplied.

In the example shown in RULE1 and RULE2, the template to be referred to by the program reproduction control section 23 is changed from the template 1 to the template 2, if a product is purchased and the purchase process finishes, while a reproduced program CM1 is being reproduced.

In the example shown in FIG. 4, the program reproduction control section 23 changes a target template to be referred to, based on the timing information and the presence/absence of the purchase completion signal. The present invention, however, is not limited to this example. For example, the following arrangement may be adopted: based on the timing information and the presence/absence of the purchase completion signal, the template management section 25 obtains, from an external device (e.g. the template providing server 300), a template which is newly referred to, and the template management section 25 stores the obtained template in the template storage 42.

The aforesaid template is referred to by the program reproduction control section 23 or the template management section 25, so that each mobile phone 100 can reproduce an appropriate program, based on which programs have been stored and reproduced in the mobile phone 100.

Therefore, even if the most suitable program to be reproduced is changed because the mobile phone 100 serially receives broadcasted programs and the user views various programs, it is possible to newly select the most suitable program to be reproduced, in consideration of (i) which programs have been stored in the program data storage 41 that stores programs having been supplied and (ii) how many times the programs have been reproduced.

As a result, even if a program is broadcasted in a one-to-many manner, each mobile phone 100 can reproduce an appropriate program in accordance with use conditions of the mobile phone 100, and hence diversified needs of the users are satisfied.

When a broadcast program identical with a stored program having been received is supplied (i.e. when a re-broadcasted program is supplied), the program reproduction control section 23 may select, as a reproduced program, another stored program having a different program ID, in addition to the supplied broadcast program.

First, the program reproduction control section 23 judges if the broadcast program ID extracted by the program ID extraction section 22 matches with one of the stored program IDs in the program data storage 41. In this case, the program reproduction control section 23 simultaneously or serially reproduces the received broadcast program and at least one of the stored programs having a stored program ID different from the aforesaid broadcast program ID.

In this manner, instead of reproducing a broadcast program totally identical in terms of content with the stored program having been supplied, a basic broadcast program and another stored program are reproduced together. As a result, while the broadcast server 200 always broadcasts the same program, the mobile phone 100 can reproduce a different program each time the program is supplied from the broadcast server 200.

Alternatively, at the time of receiving a broadcast program different from those stored ones, the program reproduction control section 23 may simultaneously or serially reproduce that broadcast program and at least one of the stored programs.

For example, the rule 2 of the template 3 shown in FIG. 4 describes that, the program data storage 41 stores stored programs CM1-CM5, and in a case where a program (CMX), which is different from any one of the programs CM1-CM5 but is one of programs CM6-CM12, is supplied, the CM4 and CMX are selected as reproduced programs. The template 3 may further describe that (i) the CMX is reproduced after the CM4, or (ii) the CM4 is reproduced on the main screen of the display 5, while the CMX is simultaneously displayed on the sub screen. In this manner, the order of reproduction, the positions of reproduction, or the like may be specified.

The template may also describe that, if the program ID extraction section 22 detects that there is no stored program in the program data storage 41 at the time of receiving a broadcast program, the communication device 3 obtains predetermined stored programs via the communication control section 12.

The template may also describe that, if, at the time of receiving a broadcast program, the template storage 42 does not store any template, the template management section 25 gives a message to the user so as to cause him/her to decide if it is necessary to obtain a required template from a predetermined template provider.

(Rules for Selecting Reproduced Program)

Now, referring to the template shown in FIG. 4, the following will describe the steps of selecting a reproduced program (and reproduction method) of the program reproduction control section 23 of the mobile phone 100.

In the present embodiment, the below-described TV shopping programs (CM1-CM5) are reproduced in line with a particular scheme.

A TV shopping program CM1 is a program which is distributed by the broadcast server 200 on consignment by the template providing server 300 (see FIG. 2). The broadcast server 200 one-to-many broadcasts the TV shopping program CM1 to the mobile phones 100 of the respective users. Templates 1-3 shown in FIG. 4 have been supplied from the template providing server 300 to the mobile phone 100 and are stored in the template storage 42. The program reproduction control section 23 refers to the template 1. TV shopping programs (CM2 to CM5) have been supplied from the template providing server 300 to the mobile phone 100 and are stored in the program data storage 41.

Figure 5:
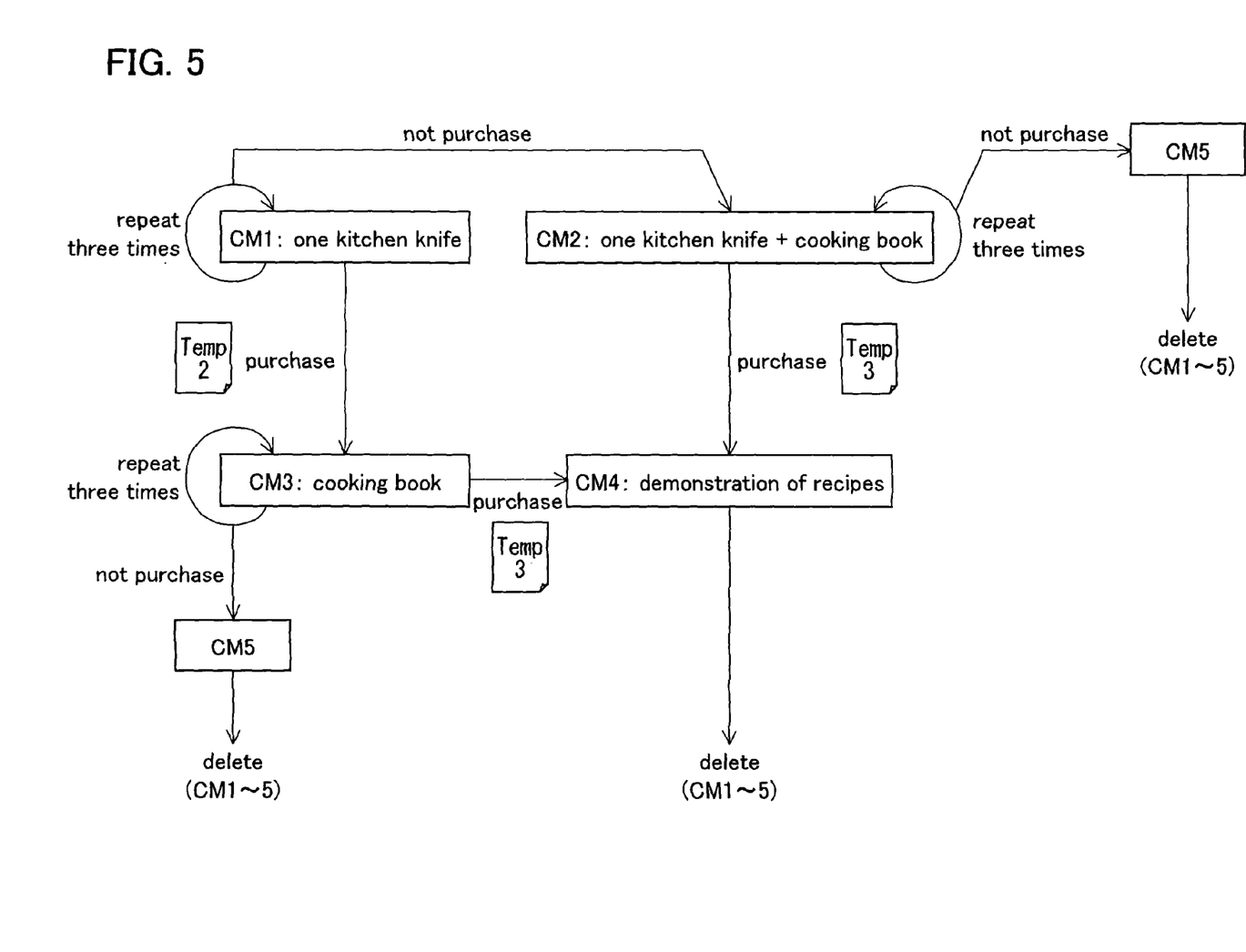
FIG. 5 illustrates how programs are reproduced in a case where a TV shopping business owner delivers a series of TV shopping programs to sell products.

FIG. 5 shows in what manner programs are reproduced, in a case where a TV shopping business owner (template providing server 300) delivers a series of TV shopping programs (CM1 to CM5) in order to sell products (kitchen knife and cooking book).

The TV shopping business owner prepares the following five programs for promoting the sales of kitchen knives.

CM1: Sales promotion program for kitchen knives

CM2: Sales promotion program for kitchen knives (and a notice that a cooking book is given away for free to the purchaser of a kitchen knife)

CM3: Sales promotion program for cooking books

CM4: Incentive program for those who bought kitchen knifes and cooking books (demonstration of recipes)

CM5: Message to those who did not purchase the products (contact information, preview of the next program, or the like)

CM1 is a program delivered to all users, for the purpose of selling kitchen knives. CM1 is regularly broadcasted by the broadcast server 200, and is supplied to the mobile phone 100. The users are invited repeatedly (e.g. 3 times) to view the program until they decide to purchase the kitchen knife.

CM2 targets the users who viewed CM1 three times but did not purchase the products. To encourage them to purchase, CM2 additionally includes a notice that a cooking book will be given away for free. CM2 is not reproduced on the mobile phones 100 of the users who bought kitchen knives upon viewing CM1.

CM3 targets those who bought kitchen knives upon viewing CM1, to sell them cooking books. The users are invited 3 times to view the program until they decide to purchase a cooking book.

CM4 targets those who bought kitchen knives and cooking books upon viewing CM2 or CM1+CM3. CM4 is an incentive program demonstrating recipes, for the privileged customers.

CM5 is a program including contact information, preview of the next program, or the like, and targets those who bought neither kitchen knives nor cooking books upon viewing the programs three times.

In the present embodiment, after CM4 or CM5 is reproduced, CMs 1 to 5 in the program data storage 41 of the mobile phone 100 are deleted.

The TV shopping business owner wishes to reproduce these five TV shopping programs in the order and timings suitable for improving advertising effects, in accordance with the behavior of each user and the stored programs in the mobile phone 100. The template 1 to 3 shown in FIG. 4 are generated to meet this requirement.

Referring to FIGS. 1-5, the following will describe the steps of a process performed by the mobile phone 100 in accordance with the template shown in FIG. 4.

(Template 1, Rule 1: a Broadcast Program which is Not a Stored Program (i.e. Supplied for the First Time) is Selected as a Reproduced Program)

First, via the input control section 11, the broadcast reception detecting section 21 detects the supply of a broadcast program CM1. Then the program ID extraction section 22 extracts, from the broadcast program data 51 (FIG. 2), a broadcast program ID associated with the detected broadcast program CM1. Subsequently, referring to the program data storage 41, the program ID extraction section 22 extracts stored program IDs associated with stored programs.

Thereafter, based on the broadcast program ID (CM1) and the stored program IDs (CM2-CM5) extracted by the program ID extraction section 22 (i.e. based on Rule 1), the program reproduction control section 23 selects, as a reproduced program, the broadcast program CM1. The program reproduction section 26 reproduces the supplied broadcast program CM1, and the data of CM1 is supplied to the display 5 and/or the audio output device 6, via the output control section 14.

Also, in line with the description (CO7) of Rule 1, the program data management section 24 stores, as a stored program, the reproduced broadcast program CM1 in the program data storage 41. The broadcast program CM1 is stored in association with the corresponding program ID. The number of reproductions of CM1 is changed to 1.

When the program ID extraction section 22 extracts stored program IDs, it is unnecessary to extract all stored program IDs in the program data storage 41. The following arrangement may be adopted: the program ID extraction section 22 refers to the template, so as to check whether or not the program data storage 41 stores a stored program ID which is, in the template, associated with the broadcast program ID.

Also, on the contrary to the order to store the received broadcast program, the column (CO7) to which the program data management section 24 refers may include an order to delete a particular stored program. According to this order, the program data management section 24 delete a particular stored program from the program data storage 41, so that a combination of stored programs is changed.

(Template 1, Rules 2 and 3: when a Re-Broadcasted Program is Supplied, a Reproduced Program is Selected in Line with the Number of Reproductions)

If the broadcast reception detecting section 21 detects the supply of the broadcast program CM1 again, the program ID extraction section 22 extracts the broadcast program ID (CM1) and the stored program IDs (CM1 to CM5), in a similar way as above.

Subsequently, referring to the program data storage 41, the program reproduction control section 23 detects that the broadcast program CM1 has been reproduced once. Also, based on the combination of the aforesaid program IDs (i.e. based on Rule 2), the program reproduction control section 23 selects, as a reproduced program, the broadcast program CM1 again. Furthermore, the program data management section 24 increments the number of reproductions of the broadcast program CM1 by 1, in line with the description in Rule 2.

When the number of reproductions of the broadcast program CM1 reaches 3, a stored program CM2 is selected as a reproduced program, in line with Rule 3.

According to Rules 1 and 2 of the template 1, the program reproduction control section 23 starts to refer to the template 2 in place of the template 1, if, before the reproduction of CM1 three times, the user purchases a kitchen knife and the mobile phone 100 receives a purchase completion signal from the TV shopping business owner.

(Template 1, Rule 5: a Reproduced Program is Selected on the Premise that Purchase is not Conducted Even if the Number of Reproductions Reaches a Predetermined Number)

Assume that a purchasing process is not performed even if the stored program CM2 has been reproduced three times. In this case, if the broadcast reception detecting section 21 detects the supply of the broadcast program CM1, the program ID extraction section 22 extracts program IDs as above. Based on the combination of the program IDs and the number of reproductions of a predetermined stored program (i.e.

based on Rule 5), the program reproduction control section 23 selects a stored program CM5 as a reproduced program. In this way, the program reproduction section 26 causes the mobile phone 100 of the user who did not purchase the product to reproduce the stored program CM5 for prospective purchases in future.

Subsequently, in response to the reproduction of the stored program CM5, the program data management section 24 deletes the stored programs (CM1 to CM5) from the program data storage 41. This makes it possible to save the capacity of the program data storage 41.

(Template 3, Rule 2: a Reproduced Program is Selected on the Premise that a Program Different from a Predetermined Broadcast Program is Supplied)

In a case where a kitchen knife and a cooking book have been purchased upon viewing CM2 or CM1+CM3, the program reproduction control section 23 changes the referring template to the template 3.

Subsequently, when the broadcast reception detecting section 21 detects the supply of a broadcast program CMX which is different from any one of the TV shopping programs CM1-CM5, the program ID extraction section 22 extracts program IDs of the broadcast program CMX and of the stored programs, in a manner similar to the above.

Based on the combination of the program IDs (i.e. based on Rule 2), the program reproduction control section 23 selects CM4 and CMX as reproduced programs. For the selection of reproduced programs, the broadcast program CMX may be required as a series of programs CM6-CM12, which are sequels to CM4.

The description (CO7 in FIG. 4) of the process may include a description for controlling the order of reproduction of CM4 and CMX and display positions of CM4 and CMX. This allows the program reproduction control section 23 to control the program reproduction section 26 in such a manner that CM4 and CMX are reproduced in a designated order and displayed at designated display positions.

According to the method above, the mobile phone 100 of the present invention refers to the above-described template, so as to select a reproduced program and control a reproduction method of the program, based on (i) which broadcast program has been supplied and (ii) which programs have been stored.

Therefore, if the abovementioned template and programs that are related to a broadcast program to be broadcasted have been supplied (from the template providing server 300) to the mobile phone 100 in advance, the mobile phone 100 can choose a program to be reproduced in accordance with use conditions of the user, even if the broadcast server 200 repeatedly broadcasts one broadcast program in a one-to-many manner.

As a result, since the broadcast server 200 is not required to supply plural types of programs suitable for each user, it is possible to reduce the workload of the broadcast server 200. Furthermore, since the broadcast server 200 always broadcasts one program (TV shopping program CM1 in the example above) in a one-to-many manner, shortage of channels does not occur.

Because of the above, even though a broadcast program is supplied in a one-to-many manner, respective mobile phones 100 can reproduce programs in different ways. Therefore diversified needs of the users are satisfied without preparing a lot of types of programs for broadcast.

The present invention is not limited to the description of the embodiments above, but may be altered by a skilled person within the scope of the claims. An embodiment based on a proper combination of technical means disclosed in different embodiments is encompassed in the technical scope of the present invention.

The template to which the program reproduction control section 23 refers may include a management information column used for managing the template.

For example, the management information column lists an expiration date of the template and information (e.g. template ID) for specifying a new template which is selected after the expiration date.

This allows the program reproduction control section 23 to refer to a designated new template, after the expiration date of the previously-referred template comes. If a designated new template is not stored in the template storage 42, the template management section 25 may obtain the new template from a predetermined template supplier.

Also, since the expiration date of the template is described in the management information column, the template management section 25 can delete the template from the template storage 42, after the expiration date comes.

The arrangement above makes it possible to allow, for example, those purchased products to view a time-limited preferential program. In the arrangement above, the mobile phone 100 of the user who bought a kitchen knife and a cooking book can manage the template in such a manner that a program for selling a cutting board at a bargain price is reproduced only within one month after the purchase of the cooking book.

The number of reproductions, which is recorded for each stored program in the program data storage 41, is preferably counted at the end of the reproduction of the program. Alternatively, at the end of the program, the user may be asked to answer a questionnaire, in order to confirm if he/she properly viewed the program. In this way, how many times the user actually viewed the program is accurately recorded, rather than how many times the program is reproduced on the mobile phone 100 is recorded. On this account, the program reproduction control section 23 can suitably select a reproduced program, based on how many times the user viewed a program.

(Application to Correspondence Education, Etc.)

The descriptions above took, as an example, the broadcasting service providing system 60 for delivering TV shopping programs. The present invention, however, is not limited to the above. The content reproduction device of the present invention can be adopted to a broadcasting service providing system 60 delivering correspondent education programs. In the arrangement, the content reproduction device of the present invention is a personal computer (PC) having communication and TV receiver capabilities.

Assume that, for example, a plurality of correspondent education programs are grouped into chapters, templates are provided for the respective chapters, and each chapter has an expiration date.

In a case where the user of a PC purchases correspondent education programs and downloads all chapters (all templates and all stored programs) from the template providing server 300, each of the template is provided with (i) an expiration date starting from the point of the purchase and (ii) information regarding a template to be referred to in the next chapter by the program reproduction control section 23. This makes it possible to change the template referred to by the program reproduction control section 23, when the expiration date comes.

Alternatively, in a case where an expiration date is set in accordance with the user's progress of study, a result of an end-of-chapter exam is supplied to a server, and a template which will be referred to in the next chapter by the program reproduction control section 23 is supplied in response to the result of the exam.

As described above, it is possible to configure a PC that can reproduce a suitable program at a suitable timing, in accordance with each user's viewing conditions and use conditions.

The blocks of the mobile phone 100, especially the program ID extraction section 22 and the program reproduction control section 23, may be constructed by hardware logic, or by software using a CPU. The following will describe a case where the blocks of the mobile phone 100 are constructed by software.

That is, the mobile phone 100 may include members such as: a CPU (Central Processing Unit) that executes instructions of a control program realizing the functions; a ROM (Read Only Memory) storing the program; a RAM (Random Access Memory) on which the program is executed; and a storage device (storage medium) such as a memory, which stores the program and various kinds of data. The objective of the present invention may also be achieved in the following manner: program code (e.g. an executable code program, intermediate code program, and source program) of the control program of the mobile phone 100, the control program being software for realizing the functions, is recorded on a storage medium in a computer-readable manner, this storage medium is supplied to the mobile phone 100, and the computer (or CPU or MPU) reads out the program code from the storage medium and execute the program.

Examples of such a storage medium include a tape, such as a magnetic tape and a cassette tape; a magnetic disk, such as a Floppy® disk and a hard disk; a disc, such as a CD-ROM/MO/MD/DVD/CD-R; a card, such as an IC card (inclusive of a memory card); and a semiconductor memory, such as a mask ROM, an EPROM (erasable programmable read only memory), an EEPROM (electrically erasable programmable read only memory), or a flash ROM.

Alternatively, the mobile phone 100 may be capable of being connected to a communications network, allowing the program code to be supplied via the communications network. Non-limiting examples of the communications network include the Internet, intranet, extranet, LAN, ISDN, VAN, CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized by a carrier wave or as data signal sequence, which are realized by electronic transmission of the program code.

As described above, to achieve the objective above, the content reproduction device of the present invention, which is capable of reproducing (i) a broadcast content supplied through a broadcast wave and (ii) a stored content stored in a content storage, includes: a broadcast content identification information obtaining section for obtaining broadcast content identification information used for identifying a supplied broadcast content; a stored content identification information obtaining section for obtaining stored content identification information used for identifying the stored content; and a reproduction control section that selects, as at least one reproduced content, at least one of the broadcast content and the stored content, based on a combination of the obtained broadcast content identification information and the obtained stored content identification information.

Also, to achieve the objective above, the method of controlling a content reproduction device of the present invention, the content reproduction device being capable of reproducing (a) a broadcast content supplied through a broadcast wave and (b) a stored content stored in a content storage, includes the steps of: (i) obtaining broadcast content identification information used for identifying a supplied broadcast content; (ii) obtaining stored content identification information used for identifying the stored content, and (iii) based on a combination of the obtained broadcast content identification information and the obtained stored content identification information, selecting, as at least one reproduced content, at least one of the broadcast content and the stored content.

According to the arrangement above, receiving a broadcast content, the broadcast content identification information obtaining means obtains broadcast content identification information used for identifying the supplied broadcast program, while the stored content identification information obtaining section obtains stored content identification information used for identifying a stored content. Based on a combination of these sets of identification information, the reproduction control means selects, as a reproduced content, at least one of the broadcast content and the stored content.

In this manner, in response to the supply of a broadcast program, a reproduced program is selected in accordance with a combination of the supplied broadcast program and a stored program. It is therefore possible to select the most suitable content at the time, based on (i) which broadcast content is supplied and (ii) which content has been stored.

The content reproduction device serially receives broadcast contents, and the supplied broadcast contents are, as stored contents, stored in the content reproduction device. Therefore, even if a content that the user wishes to view (or a content that the user is encouraged to view) persistently changes, the most suitable program to be reproduced at a suitable timing can be selected by taking account of which contents have been stored (supplied).

As a result, even if a broadcast content is broadcasted in a one-to-many manner, the most suitable content is presented to the user at a suitable timing, and hence diversified needs of the users are satisfied.

The content reproduction device of the present invention may further include a broadcast reception detecting section (broadcast reception detecting section 21) that detects the reception of a broadcast content by the content reproduction device, and the reproduction control section selects a reproduced content when the broadcast reception detecting means detects that the content reproduction device receives a broadcast content.

According to this arrangement, the reproduction control section selects a reproduced content in reference to an identification number, at the same time as a broadcast content is supplied.

With this arrangement, at the time of receiving a broadcast content, it is possible to suitably select the most suitable content to be reproduced, in accordance with a combination of the broadcast content and a stored content. Since it is possible to select and present a suitable content to the user every time a broadcast content is supplied, diversified needs of the users are satisfied.

The content reproduction device may be arranged in such a manner that, in the content storage, information indicating how many times the stored content has been reproduced is stored in association with the stored content identification information, and the reproduction control section selects said at least one reproduced content, based on the information indicating how many times the stored content has been reproduced.

According to this arrangement, the reproduction control section selects a reproduced content, in accordance with not only the combination of the sets of identification information of the contents but also the number of times the stored content has been reproduced.

For example, a stored content which has been reproduced not less than a predetermined number of times may be disqualified as a candidate of a reproduced content. With this, even if one broadcast content is repeatedly supplied, a reproduced content is not one stored content. It is therefore possible to sustain the user's interest in contents.

Also, the content reproduction device may be arranged in such a manner that, the reproduction control section selects a plurality of reproduced contents, and determines (i) in what order the reproduced contents are reproduced and (ii) at which positions of a display screen the reproduced contents are displayed.

The reproduction control section determines the order of selected reproduced contents, and also determines a display position of each of these reproduced contents.

This makes it possible to make changes in the reproduction method of the selected reproduced contents, and hence diversified needs of the users are satisfied.

For example, assume that control information specifying the order of reproductions and display positions of reproduced contents has been stored in the storage, in association with a combination of reproduced contents. In this case, the reproduction control section obtains the control information, based on the reproduced content identification information of the selected reproduced contents. For example, in a case where the control information specifies that (i) a received broadcast content is reproduced on a main screen of the display of the content reproduction device, while (ii) stored contents A-C are serially reproduced on a sub screen of the display, in synchronism with the broadcast content, the content reproduction device is controlled in such a manner as to reproduce the contents in line with the description.

Also, the content reproduction device may be arranged in such a manner that, a template storage stores a template which describes, in association with the broadcast content identification information, a rule based on which the reproduction control section selects the reproduced content based on the combination, and the reproduction control section selects said at least one reproduced contents, based on the rule associated with the obtained broadcast content identification information.

According to the arrangement above, based on the rule in the template, the reproduction control section selects a reproduced content in line with (i) which broadcast content has been supplied and (ii) which stored contents have been stored.

That is, since the template includes the rule so that a suitable reproduced content is selected in accordance with a combination of a broadcast content and stored contents, the reproduction control section can select a suitable reproduced content at a suitable timing, based on the rule.

For example, the template and service contents (stored contents) associated with a broadcast content have been supplied and stored in the content reproduction device. With this arrangement, the content reproduction device can select a suitable reproduced content, even if the broadcasting content provider repeatedly broadcasts one broadcast content in a one-to-many manner.

Because of the above, the broadcast content provider is not required to prepare plural types of contents for each user, and hence it is possible to reduce the workload of the broadcast content provider. Moreover, even if the broadcast content provider always broadcasts one program in a one-to-many manner, diversified needs of the users are still satisfied. On this account shortage of channels due to excessive numbers of contents does not occur.

As a result, even if a broadcast content is broadcasted in a one-to-many manner, a suitable content is selected and reproduced at a suitable timing. Therefore, diversified needs of the users are satisfied without preparing enormous numbers of broadcast contents.

The content reproduction device is preferably arranged in such a manner that, the template includes timing information based on which a timing to replace a template that the reproduction control section refers is specified, and based on the timing information, the reproduction control section replaces a template to be referred to.

According to the arrangement above, the reproduction control section replaces a template to be referred to, when it is determined based on the timing information that the referred template must be replaced.

Therefore, when a predetermined condition is met, the rule based on which the reproduction control section selects a reproduced content is changed. Based on the new rule, the reproduction control section selects a reproduced content.

Because of the above, a suitable reproduced content is selected in accordance with the conditions of content reproduction, so that diversified needs of the users are satisfied.

The content reproduction device is preferably arranged in such a manner that, the template describes, as the timing information, a rule based on the combination of the broadcast content identification information and the stored content identification information, and the reproduction control section replaces a template to be referred to, in a case where the obtained broadcast content identification information and the stored content identification information satisfy the rule based on the combination.

According to the arrangement above, the reproduction control section selects a reproduced content based on different rules and conditions, in a case where the combination of the sets of identification information is changed because a new content is added or a stored content is deleted.

As a result, it is possible to select a suitable reproduced contents at the time, in accordance with changes in use conditions.

The reproduction control section may replace a template to be referred to, in a case where a predetermined control signal is supplied from an external device.

Assume that a TV shopping program promoting the purchase of a product is supplied to the content reproduction device, the user decides to purchase the product promoted in the reproduced content, and in response to the purchase, a server of a selling agency sends, to the content reproduction device, a control signal (corresponding to the aforesaid predetermined control signal) indicating that the purchase process has completed.

In this case, the reproduction control section replaces a template to be referred to, in response to the control signal indicating that the purchase process has completed. More specifically, for example, the template is replaced with a template which describes that a special content, which is exclusively for the users of the content reproduction devices having conducted the purchase process, is selected as a reproduced content.

With this arrangement, the reproduction control section can select, as a reproduced content, the special content, based on the new template and a predetermined combination of sets of identification information of the respective contents.

On account of the above, only the content reproduction devices having received a predetermined control signal from an external device can reproduce the special content. It is therefore possible to satisfy diversified needs of the users, by selecting a suitable reproduced content in accordance with changes in use conditions.

The content reproduction device may further include a template obtaining section (template management section 25) that (i) obtains, based on the timing information and from an external device, a template which is newly referred to by the reproduction control section, and (ii) stores the obtained template in the template storage.

According to the arrangement above, in accordance with the timing information, the template obtaining section obtains a predetermined new template. The reproduction control section refers to the obtained template, so that the reproduction control section can select a reproduced content based on a different rule.

Therefore, in a case where a content suitable to be reproduced is changed because the content reproduction device serially receives broadcast contents and various contents are reproduced, the reproduction control section can select a suitable content to be reproduced, in consideration of (i) which contents have been stored or (ii) how many times the stored contents have been reproduced.

As a result, even if a broadcast content is broadcasted in a one-to-many manner, a suitable content is selected and reproduced at a suitable timing, in line with use conditions of the content reproduction device. Therefore, diversified needs of the users are satisfied.

The content reproduction device may be realized using a computer. In such a case, the scope of the present invention encompasses (i) a control program of the content reproduction device, which program causes a computer to function as the aforesaid sections, so that the content reproduction device is realized by the computer, and (ii) a computer-readable storage medium storing the control program.

As described above, in the broadcasting service providing system in which a program is broadcasted in a one-to-many manner, the content reproduction device of the present invention can reproduce different programs in consideration of each user or use conditions. On this account, the content reproduction device of the present invention can be broadly adopted in content delivery services such as mail order and correspondence education using a bidirectional communication system with the cooperation of broadcasting and communications.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A content reproduction device capable of reproducing (i) a broadcast promotion program supplied through a broadcast wave and (ii) one or more of a plurality of stored interrelated promotion programs that are interrelated by subject matter content and that are stored in a content storage, the content reproduction device comprising:

broadcast program ID obtaining means for obtaining broadcast program ID used for identifying a supplied broadcast promotion program when the broadcast promotion program is supplied;

stored program ID obtaining means for obtaining stored program ID used for identifying the plurality of stored interrelated promotion programs stored in the content storage at a time when the broadcast promotion program is supplied;

a template storage that stores at least one template which includes a plurality of applicable rules that determine the one or more of the plurality of interrelated promotion programs stored in the content storage; and reproduction control means that selects one or more of the plurality of interrelated promotion programs to be reproduced at a timing when the broadcast promotion program is supplied based on a combination of (a) the obtained broadcast program ID, (b) the obtained stored program ID, and (c) an applicable rule obtained from the template storage which is applicable under a predetermined reproduction condition, wherein:

when the plurality of reproduced promotion programs selected from (I) the broadcast promotion program and (II) said one or more of the plurality of stored interrelated promotion programs to be reproduced, the reproduction control means determines at which positions the plurality of reproduced promotion programs is to be reproduced, the reproduction control means determining the positions according to control information predetermined based on a set of program IDs of reproduced promotional programs.

2. The content reproduction device as defined in claim 1, wherein, in the content storage, information indicating how many times the stored interrelated promotion program has been reproduced is stored in association with the stored program ID, and the reproduction control means selects said one or more of the plurality of interrelated promotion programs, based on the information indicating how many times the stored interrelated promotion program has been reproduced.

3. The content reproduction device as defined in claim 1, wherein, the reproduction control means selects a plurality of reproduced interrelated promotion programs, and determines (i) in what order the reproduced interrelated promotion programs are reproduced and (ii) at which positions of a display screen the reproduced interrelated promotion programs are displayed.

4. The content reproduction device as defined in claim 1, wherein, the template includes timing information based on which a timing to replace a template that the reproduction control means refers is specified, and based on the timing information, the reproduction control means replaces a template to be referred to.

5. The content reproduction device as defined in claim 4, wherein, the template describes, as the timing information, a rule based on the combination of the broadcast program ID and the stored program ID, and the reproduction control means replaces a template to be referred to, in a case where the obtained broadcast program ID and the stored program ID satisfy the rule based on the combination.

6. The content reproduction device as defined in claim 4, further comprising:

template obtaining means for (i) obtaining, from an external device, a template to be newly referred to by the reproduction control means, in accordance with the timing information, and (ii) storing the obtained template in the template storage.

7. The content reproduction device as defined in claim 5, wherein:
the template storage stores at least one template which includes a plurality of reproduction condition rules that each establish a predetermined condition that must be met for the reproduction of the one or more of the plurality of stored interrelated promotion programs stored in the content storage to occur:
said applicable rule which is applicable under the predetermined reproduction condition is an applicable reproduction condition rule that establishes the predetermined condition that must be met for the reproduction, the applicable reproduction condition rule being obtained by referring to the at least one template; and
said at least one template further includes at least one template changing rule that establishes a predetermined change condition that must be met in order to replace the at least one template that the reproduction control means refers to with a different template in order to obtain one or more different reproduction condition rules.

8. The content reproduction device as defined in claim 1, wherein,
when the content reproduction device received a predetermined control signal from an external device, the reproduction control means replaces a template to be referred to.

9. The content reproduction device as defined in claim 1, wherein
a content of the broadcast promotion program and a content of the stored interrelated promotion programs are sequentially interrelated, and the reproduction control means selects a succeeding reproduced promotion program to be reproduced, based on a response of a user after reproduction of a preceding reproduced promotion program.

10. The content reproduction device as defined in claim 1, wherein
the content reproduction device is a mobile phone.

11. A method of controlling a content reproduction device capable of reproducing (a) a broadcast promotion program supplied through a broadcast wave and (b) one or more of a plurality of stored interrelated promotion programs that are interrelated by subject matter content and that are stored in a content storage,
the method comprising:
the content reproduction device obtaining broadcast program ID used for identifying a supplied broadcast promotion program when the broadcast promotion program is supplied;
(ii) the content reproduction device obtaining stored program ID used for identifying the plurality of stored interrelated promotion programs stored in the content storage at a time when the broadcast promotion programs is supplied;
(iii) storing at least one template in template storage with each stored template including a plurality of applicable rules that determine the one or more of the plurality of interrelated promotion programs stored in the content storage; and
(iv) based on a combination of (a) the obtained broadcast program ID, (b) the obtained stored program ID, and (c) an applicable rule obtained from the template storage which is applicable under a predetermined reproduction condition the content reproduction device selecting one or more of the plurality of interrelated promotion programs to be reproduced at a timing when the broadcast promotion program is supplied,
wherein in step (iv), when a plurality of reproduced promotion programs selected from (I) the broadcast promotion program and (II) said plurality of stored interrelated promotion programs to be reproduced, the content reproduction device determines at which positions the plurality of reproduced promotion programs is to be reproduced, the content reproduction device determining the positions according to control information predetermined based on a set of program IDs of the plurality of reproduced promotional programs.

12. The content reproduction device as defined in claim 1, wherein when a plurality of reproduced promotion programs is to be reproduced, the reproduction control means determines in what order the plurality of reproduced promotion programs is to be reproduced, the reproduction control means determining the order according to control information predetermined based on a set of program IDs of the plurality of reproduced promotion programs.

13. The method of controlling the content reproduction device as defined in claim 11, wherein
the content reproduction device is a mobile phone.

14. A non-transitory computer-readable storage medium storing a control program which causes a content reproduction device to reproduce (a) a broadcast promotion program, supplied through a broadcast wave and (b) one or more of a plurality of stored interrelated promotion programs that are interrelated by subject matter content and that are stored in a content storage,
the control program causing a computer to execute the steps of:
(i) obtaining broadcast program ID used for identifying a supplied broadcast promotion program when the broadcast promotion program is supplied;
(ii) obtaining stored program ID used for identifying the plurality of stored interrelated promotion programs stored in the content storage at a time when the broadcast promotion program is supplied;
(iii) storing at least one template in template storage with each stored template including a plurality of applicable rules that determine the one or more of the plurality of interrelated promotion programs stored in the content storage; and
(iv) based on a combination of (a) the obtained broadcast program ID, the obtained stored program ID, and applicable rule obtained from the template storage which is applicable under a predetermined reproduction condition, selecting, one or more of the plurality of interrelated promotion programs to be reproduced at a timing when the broadcast promotion program is supplied,
wherein in step (iv), when a plurality of reproduced promotion programs selected from (I) the broadcast promotion program and (II) said plurality of stored interrelated promotion programs to be reproduced, the computer determines at which positions the plurality of reproduced promotion programs is to be reproduced, the computer determining the positions according to control information predetermined based on a set of program IDs of the plurality of reproduced promotional programs.

* * * * *